US012039944B2

(12) United States Patent
Li et al.

(10) Patent No.: US 12,039,944 B2
(45) Date of Patent: Jul. 16, 2024

(54) BACKLIGHT DATA TRANSMISSION METHOD, MICRO CONTROL UNIT AND LOCAL DIMMING BACKLIGHT SYSTEM

(71) Applicants: Beijing BOE Display Technology Co., Ltd., Beijing (CN); BOE TECHNOLOGY GROUP CO., LTD., Beijing (CN)

(72) Inventors: Shou Li, Beijing (CN); Hengyu Yan, Beijing (CN); Wenyu Li, Beijing (CN); Zhiming Meng, Beijing (CN); Jian Zhang, Beijing (CN); Zhanchang Bu, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/639,166

(22) PCT Filed: Apr. 26, 2021

(86) PCT No.: PCT/CN2021/089829
§ 371 (c)(1),
(2) Date: Feb. 28, 2022

(87) PCT Pub. No.: WO2022/226717
PCT Pub. Date: Nov. 3, 2022

(65) Prior Publication Data

US 2024/0038182 A1 Feb. 1, 2024

(51) Int. Cl.
*G09G 3/34* (2006.01)

(52) U.S. Cl.
CPC ......... *G09G 3/342* (2013.01); *G09G 2370/00* (2013.01)

(58) Field of Classification Search
CPC ........................... G09G 3/342; G09G 2370/00
See application file for complete search history.

(56) References Cited

U.S. PATENT DOCUMENTS 10,692,443 B2 * 6/2020 Wu .......................... H03K 7/08
11,030,960 B2 * 6/2021 Morein ................ G09G 3/3406
(Continued)

FOREIGN PATENT DOCUMENTS

CN 104332140 A 2/2015
CN 109192149 A 1/2019
(Continued)

*Primary Examiner* — Michael Pervan
(74) *Attorney, Agent, or Firm* — HOUTTEMAN LAW LLC

(57) ABSTRACT

The present disclosure provides a backlight data transmission method including: receiving, in response to a first vertical synchronization signal of a current image frame sent from a logic circuit board, an entire of backlight data sent from the logic circuit board during a first preset time period, where the entire backlight data includes backlight data corresponding to backlight regions, and duration of the first preset time period is longer than duration of the first vertical synchronization signal in an active level state during one period; and sending the entire backlight data to a backlight driving module during a second preset time period after the first preset time period, where a sum of the duration of the first preset time period and duration of the second preset time period is less than a period of the first vertical synchronization signal.

15 Claims, 4 Drawing Sheets

(56) References Cited

U.S. PATENT DOCUMENTS

| | | | | |
|---|---|---|---|---|
| 11,107,423 | B2 * | 8/2021 | Ji | H05B 45/325 |
| 11,176,895 | B2 * | 11/2021 | Sun | G09G 3/342 |
| 2019/0164506 | A1 * | 5/2019 | Wu | G09G 3/3406 |
| 2019/0371253 | A1 * | 12/2019 | Morein | G09G 3/3406 |
| 2020/0051484 | A1 * | 2/2020 | Yashiki | G09G 3/32 |
| 2020/0051512 | A1 * | 2/2020 | Li | G09G 3/3607 |
| 2020/0413508 | A1 | 12/2020 | Ji et al. | |
| 2021/0142739 | A1 * | 5/2021 | Sun | G09G 3/2014 |

FOREIGN PATENT DOCUMENTS

| | | | |
|---|---|---|---|
| CN | 109461413 | A | 3/2019 |
| CN | 109859696 | A | 6/2019 |
| CN | 110827768 | A | 2/2020 |
| CN | 111508441 | A | 8/2020 |
| CN | 112204647 | A | 1/2021 |
| TW | I693825 | B | 5/2020 |

* cited by examiner

BACKLIGHT DATA TRANSMISSION METHOD, MICRO CONTROL UNIT AND LOCAL DIMMING BACKLIGHT SYSTEM

TECHNICAL FIELD

The present disclosure relates to the field of display technology, and in particular relates to a backlight data transmission method, a micro control unit and a local dimming backlight system.

BACKGROUND

The local dimming technology involves dividing a backlight part into a plurality of backlight regions each being controlled independently. For example, the backlight regions corresponding to a lower-luminance area in a display image are dimmed, or the backlight regions corresponding to a middle-luminance area or higher-luminance area in the display image is brightened, so that contrast of the display image can be effectively increased, and the quality of the display image can be improved.

SUMMARY

The present disclosure provides a backlight data transmission method, a micro control unit and a local dimming backlight system.

In a first aspect, an embodiment of the present disclosure provides a backlight data transmission method that is applied to a micro control unit and includes:

- receiving, in response to a first vertical synchronization signal of a current image frame from a logic circuit board, an entire of backlight data from the logic circuit board during a first preset time period, wherein the entire of the backlight data includes backlight data corresponding to backlight regions, and wherein duration of the first preset time period is longer than duration of the first vertical synchronization signal in an active level state in one period; and
- sending the entire of the backlight data to a backlight driving module during a second preset time period after the first preset time period, wherein a sum of the duration of the first preset time period and duration of the second preset time period is less than a period of the first vertical synchronization signal.

In some embodiments, the backlight data is transmitted between the logic circuit board and the micro control unit based on a serial peripheral interface protocol.

In some embodiments, the duration T1 of the first preset time period satisfies:

$$\frac{A*n1+B}{f1}*\alpha \le T1 < \frac{1}{f2}$$

where n1 is a total number of backlight regions, A is a bit number of backlight data corresponding to one backlight region, B is a bit number of non-backlight data transmitted during a process of transmitting the entire of the backlight data between the logic circuit board and the micro control unit, f1 is a signal transmission frequency between the logic circuit board and the micro control unit, f2 is a backlight refresh frequency, and $\alpha$ is a first preset margin coefficient and $1\le\alpha\le1.5$.

In some embodiments, the bit number A of backlight data corresponding to one backlight region is 16, the bit number B of non-backlight data transmitted during the process of transmitting the entire of the backlight data between the logic circuit board and the micro control unit is 32, and the preset margin coefficient $\alpha$ is 1.1.

In some embodiments, the backlight data is transmitted between the micro control unit and the driving module based on a serial peripheral interface protocol.

In some embodiments, the duration T2 of the second preset time period satisfies:

$$\frac{A*n2+C+N*D}{f3}*\beta \le T2 < \frac{1}{f2}$$

where n2 is a number of backlight regions corresponding to one communication channel through which the most backlight data is transmitted between the micro control unit and the driving module, A is a bit number of backlight data corresponding to one of the backlight regions, C is a bit number of non-backlight data transmitted during a process of transmitting the entire of the backlight data between the micro control unit and the backlight driving module, N is a number of driving chips in the backlight driving module, D is a bit number for identifying one of the driving chips, f3 is a signal transmission frequency between the micro control unit and the driving module, f2 is a backlight refresh frequency, and $\beta$ is a second preset margin coefficient and $1\le\beta\le1.5$.

In some embodiments, the bit number A of the backlight data corresponding to one of the backlight regions is 16, the bit number C of the non-backlight data transmitted during a process of transmitting the entire of the backlight data between the logic circuit board and the micro control unit is 24, the bit number D for identifying one of the driving chips is 8, and the second preset margin coefficient $\beta$ is 1.1.

In some embodiments, the total number of the backlight regions is 72; and

- two communication channels are provided between the micro control unit and the driving module, one of the two communication channels is configured to transmit backlight data corresponding to forty backlight regions of the seventy-two backlight regions, and the other of the two communication channels is configured to transmit backlight data corresponding to the remaining thirty-two backlight regions of the seventy-two backlight regions.

In some embodiments, when the first vertical synchronization signal received from the logic circuit board is switched from an inactive level state to an active level state, the micro control unit starts receiving the backlight data from the logic circuit board.

In some embodiments, the duration T1 of the first preset time period and the duration T2 of the first preset time period satisfy:

$$T1+T2\le\frac{1}{f2}$$

where f2 is a backlight refresh frequency.

In some embodiments, the duration T1 of the first preset time period and the duration T2 of the first preset time period satisfy:

$$\frac{1}{2} \le \frac{T1}{T2} \le 2.$$

In some embodiments, before the receiving, in response to the first vertical synchronization signal from the logic circuit board, the entire of the backlight data from the logic circuit board during the first preset time period, the method further includes:

collecting a second vertical synchronization signal corresponding to a plurality of image frames before the current image frame, and determining, according to a frequency of the second vertical synchronization signal, a frequency of a third vertical synchronization signal, wherein one period of the third vertical synchronization signal includes: one first preset time period and one preset second time period; and the frequency of the third vertical synchronization signal is P times the frequency of the second vertical synchronization signal, where P is a positive integer.

In some embodiments, P is 8.

In a second aspect, an embodiment of the present disclosure further provides a micro control unit, including: a processor, and a storage medium having a computer program stored thereon which, when executed by the processor, the computer program implements the backlight data transmission method as provided in the first aspect.

In a third aspect, an embodiment of the present disclosure further provides a local dimming backlight system, including: a logic circuit board, a backlight driving module, and the micro control unit as provided in the second aspect.

DETAIL DESCRIPTION OF EMBODIMENTS

To improve understanding of the technical solution of the present disclosure for those skilled in the art, the backlight data transmission method, the micro control unit and the local dimming backlight system provided in the present disclosure will be described below in detail in conjunction with the accompanying drawings.

Example embodiments will be described more sufficiently below with reference to the accompanying drawings, but which may be embodied in different forms and should not be construed as limited to the embodiments set forth herein. Rather, these embodiments are provided so that the present disclosure will be thorough and complete, and will fully convey the scope of the present disclosure to those skilled in the art.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "comprise" and/or "consist of . . . " specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various objects, these objects should not be limited by these terms, and these terms are only used to distinguish one object from another.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

Figure 1:
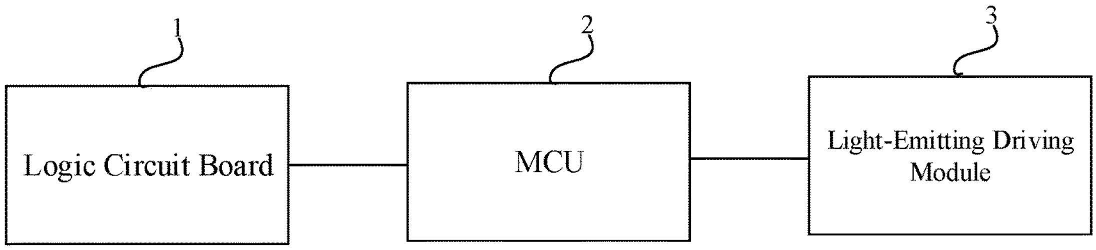
FIG. 1 is a block diagram showing a structure of a local dimming backlight system according to the present disclosure.

FIG. 1 is a block diagram showing a structure of a local dimming backlight system according to the present disclosure. As shown in FIG. 1, a local dimming backlight system includes: a logic circuit board (TCON, also called control circuit board) 1, a micro control unit (MCU) 2, and a light-emitting driving module 3.

The local dimming process is implemented as follows: an external digital circuit board sends image data to the logic circuit board 1; the logic circuit board 1 performs computation by using a preset local dimming algorithm based on the received image data to generate backlight data for backlight regions; after obtaining the backlight data for the backlight regions, the logic circuit board 1 sends the backlight data for the backlight regions to the micro control unit 2; and after receiving all the backlight data, the micro control unit 2 sends the backlight data to the light-emitting driving module 3; the light-emitting driving module 3 generates drive signals corresponding to the backlight regions according to the received backlight data for the backlight regions, so as to drive light-emitting elements (such as LEDs) in the backlight regions to emit light.

Since the process of computing the backlight data for the backlight regions by the logic circuit board 1 and the process of transmitting the backlight data to the light-emitting driving module 3 need to take some time, there is a time delay from the time when the logic circuit board 1 receives the image data to the time when the light-emitting driving module 3 outputs the driving signals according to the backlight data, that is, a total time delay in the local dimming process. Since the time for the logic circuit board 1 computing the backlight data for the backlight regions is generally within the time corresponding to one frame of image and transmission of the backlight data starts from the next frame, the time delay is generally greater than the time corresponding to one frame of image.

Figure 2:
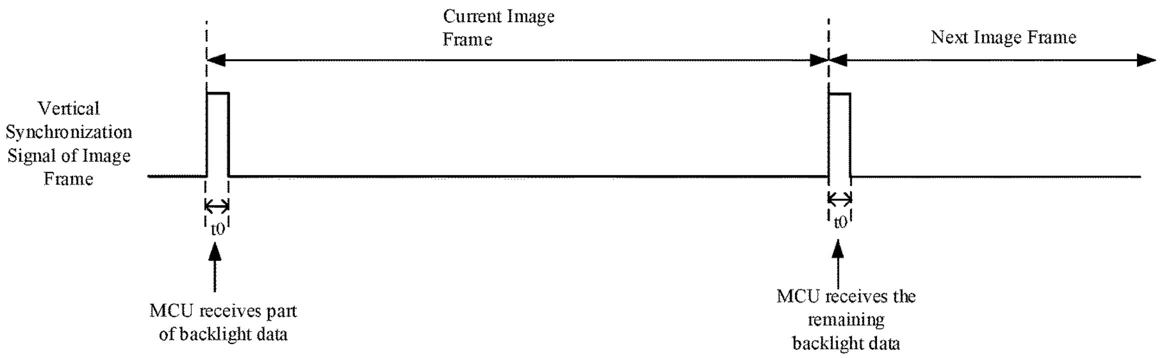
FIG. 2 is a timing diagram corresponding to a process of transmitting backlight data from a logic circuit board to a light-emitting driving module according to the related art.

In order to facilitate a better understanding of the technical solutions of the present disclosure by those skilled in the art, a description of the related art will now be given below. FIG. 2 is a timing diagram corresponding to the process of transmitting backlight data from the logic circuit board 1 to the light-emitting driving module 3 according to the related art. As shown in FIG. 2, in the related art, the micro control unit 2 receives data under control of a vertical synchronization signal of an image frame from the logic circuit board 1. Specifically, the vertical synchronization signal of the image frame includes a first portion in an active level state and a second portion in an inactive level state. For example, the active level state is a higher level state, and the inactive level state is a lower level state. When the vertical synchronization signal of the image frame is in a higher level state, the micro control unit 2 acquires backlight data of the backlight regions from the logic circuit board 1. Since the vertical synchronization signal of the image frame has a relatively small pulse width and the vertical synchronization signal keeps in the higher level state for a relatively short time during a time period corresponding to one image frame (i.e., the first portion lasts for a short time), the micro control unit 2 cannot acquire all the backlight data of the backlight regions during a time period during which the vertical synchronization signal of the image frame is at a high level state in one period of the vertical synchronization signal (i.e., cannot acquire the entire of the backlight data). Therefore, the micro control unit 2 generally receives part of the backlight data during a time period t0 during which the vertical synchronization signal corresponding to one image frame remains in the higher level state, and then stores the received part of the backlight data through direct memory access (DMA). After receiving the vertical synchronization signal corresponding to the next image frame from the logic circuit board 1, the micro control unit 2 receives the remaining part of backlight data during a time period t0 in which the vertical synchronization signal corresponding to the next image frame is in a higher level state, so that the entire of the backlight data is obtained; and finally, the micro control unit 2 sends all the data to the light-emitting driving module 3.

It can be seen that, in the related art, the time taken for the backlight data to be transmitted from the logic circuit board 1 to the light-emitting driving module 3 is also longer than the duration corresponding to one frame of image. Since the duration corresponding to the backlight data of the backlight regions calculated by the logic circuit board 1 equals to the duration corresponding to one frame of image, the total time delay in the related art, from the time when the logic circuit board 1 receives the image data to the time when the light-emitting driving module 3 outputs the driving signal according to the backlight data, is longer than the duration corresponding to two frames of image. The longer the total time delay is, the greater the risk of the display signal and the backlight signal getting out of synchronization.

In order to effectively improve above technical problem, an embodiment of the present disclosure provides a corresponding solution. The following detailed description is given with reference to the accompanying drawings.

Figure 3:
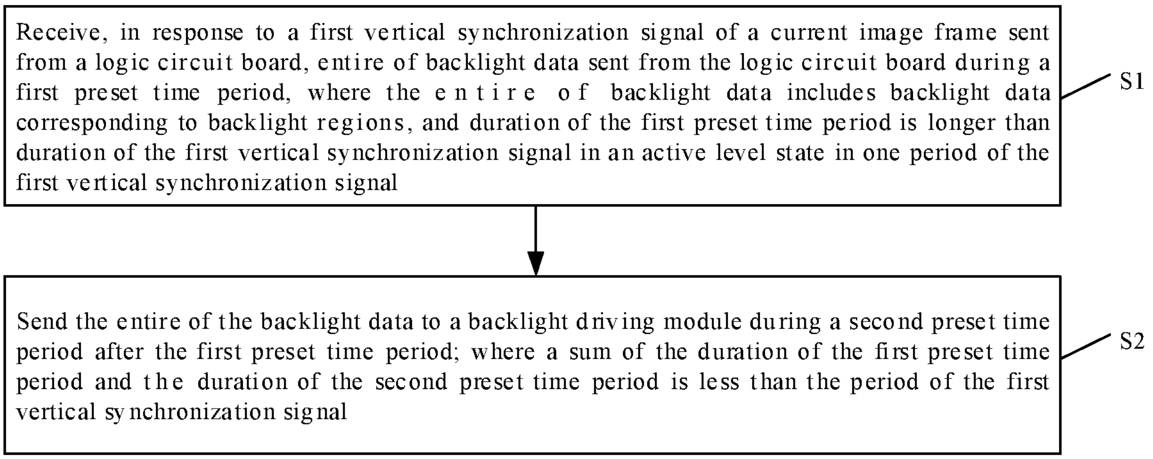
FIG. 3 is a flowchart showing a backlight data transmission method provided in an embodiment of the present disclosure.

FIG. 3 is a flowchart showing a backlight data transmission method provided in an embodiment of the present disclosure. As shown in FIG. 3, the backlight data transmission method is applied to a micro control unit 2 in a local dimming backlight system, and the backlight data transmission method includes the following steps S1 to S2.

At Step S1, in response to a first vertical synchronization signal of a current image frame from a logic circuit board, all the backlight data from the logic circuit board is received during a first preset time period. All of the backlight data includes backlight data corresponding to the backlight regions, and duration of the first preset time period is longer than duration of the first vertical synchronization signal in an active level state in one period of the first vertical synchronization signal.

At Step S2, all the backlight data is transmitted to a backlight driving module during a second preset time period after the first preset time period. A sum of the duration of the first preset time period and duration of the second preset time period is less than the period of the first vertical synchronization signal.

In an embodiment of the present disclosure, the time for the micro control unit 2 receiving the backlight data from the logic circuit board 1 is no longer under control of the time period during which the vertical synchronization signal (i.e., the first vertical synchronization signal) of the image frame remains in the active level state, but is based on a predefined first preset time period. The first preset time period is longer than the duration of the first vertical synchronization signal in the active level state, so that the micro control unit 2 can acquire the entire of the backlight data continuously and in one time. In addition, in a second preset time period after the entire of the backlight data is received, the micro control unit 2 may send the entire of the backlight data to the backlight driving module 3. Since the sum of the duration of the first preset time period and duration of the second preset time period is less than the period of the first vertical synchronization signal, the total time taken for the backlight data to be transmitted from the logic circuit board 1 to the light-emitting driving module 3 is less than the duration corresponding to one frame of image. Therefore, compared with the related art, the technical solution of the present disclosure takes a shorter time for the backlight data to be transmitted from the logic circuit board 1 to the light-emitting driving module 3, thereby decreasing the total time delay in the local dimming process, and reducing the risk of the display signal and the backlight signal getting out of synchronization.

In some embodiments, the backlight data is transmitted between the logic circuit board 1 and the micro control unit 2 based on a serial peripheral interface (SPI) protocol. In some embodiments, the backlight data is transmitted between the micro control unit 2 and the driving module 3 based on a serial peripheral interface protocol. The serial peripheral interface is a high-speed, full-duplex and synchronous communication bus, which has a signal transmission frequency up to 15 MHZ and thus a higher data transmission rate. Taking one backlight region corresponding to 16 bits of backlight data as an example, transmitting the backlight data corresponding to one backlight region through the SPI protocol takes $16/15000$ ms for the shortest time.

In some embodiments, the duration T1 of the first preset time period satisfies:

$$\frac{A*n1+B}{f1}*\alpha \le T1 < \frac{1}{f2} \qquad \text{Equation (1)}$$

where n1 is the total number of the backlight regions, A is the bit number of backlight data corresponding to one of the backlight regions, B is the bit number of non-backlight data (for example, the broadcast information such as a device address, a register address) transmitted during a process of transmitting the entire of the backlight data between the logic circuit board 1 and the micro control unit 2, f1 is a signal transmission frequency between the logic circuit board 1 and the micro control unit 2, f2 is a backlight refresh frequency, and $\alpha$ is a first preset margin coefficient and $1 \le \alpha \le 1.5$.

In some embodiments, the bit number A of the backlight data corresponding to one backlight region is 16, the bit number B of the non-backlight data transmitted during the process of transmitting the entire of the backlight data between the logic circuit board 1 and the micro control unit 2 is 32, and the preset margin coefficient α is 1.1.

In this case, the above equation (1) becomes:

$$\frac{16*n1+32}{f1}*1.1 \le T1 < \frac{1}{f2} \quad \text{Equation (2)}$$

In some embodiments, the duration T2 of the second preset time period satisfies:

$$\frac{A*n2+C+N*D}{f3}*\beta \le T2 < \frac{1}{f2} \quad \text{Equation (3)}$$

where n2 is the number of backlight regions corresponding to one communication channel which transmits the most backlight data between the micro control unit 2 and the driving module 3, A is the bit number of backlight data corresponding to one of the backlight regions, C is the bit number of non-backlight data transmitted in the process of transmitting the entire of the backlight data between the micro control unit 2 and the backlight driving module 3, N is the number of driving chips in the backlight driving module 3, D is the bit number for identifying one of the driving chips, f3 is a signal transmission frequency between the micro control unit 2 and the driving module 3, f2 is a backlight refresh frequency, and β is a second preset margin coefficient and 1≤β≤1.5.

In some embodiments, the bit number A of the backlight data corresponding to one backlight region is 16, the bit number C of the non-backlight data transmitted in the process of transmitting the entire of the backlight data between the logic circuit board 1 and the micro control unit 2 is 24, the bit number D for identifying one driving chip is 8, and the second preset margin coefficient β is 1.1.

In this case, equation (3) becomes:

$$\frac{16*n2+24+N*8}{f3}*\beta \le T2 < \frac{1}{f2} \quad \text{Equation (4)}$$

It should be noted that due to the limited number of channels per driving chip, a plurality of driving chips are needed for driving in case of a large number of backlight regions. Therefore, the plurality of driving chips need to be identified during the transmission process of the backlight data. The number of driving chips in the backlight driving module 3 is:

$$N = \left\lceil \frac{n1}{s} \right\rceil,$$

where n1 is the total number of the backlight regions, S is the number of channels configured for one driving chip, and $$\left\lceil \frac{n1}{s} \right\rceil$$

represents rounding up the quotient of n1 and S. Taking the total number of the backlight regions n1=72 and the number of channels configured for one driving chip S=16 as an example, in this case the number of the driving chips required is N=5.

In some embodiments, the total number of the backlight regions is 72, one communication channel is provided between the micro control unit 2 and the driving module 3; and two communication channels (e.g., two SPI channels) are provided between the micro control unit 2 and the driving module 3, one of which is configured to transmit backlight data corresponding to forty backlight regions, and the other of which is configured to transmit backlight data corresponding to the remaining thirty-two backlight regions. In this case, n1 in the above equations (1) and (2) takes a value of 72, and n2 in the equations (3) and (4) takes a value of 40.

In some embodiments, when the first vertical synchronization signal received from the logic circuit board 1 is switched from an inactive level state to an active level state, the micro control unit 2 starts receiving the backlight data from the logic circuit board 1. With such arrangement, when a previous image frame ends and a current image frame starts, the micro control unit 2 may synchronously start to acquire the backlight data from the logic circuit board 1, thereby decreasing the total time delay in the local dimming process.

In some embodiments, the duration T1 of the first preset time period and the duration T2 of the first preset time period satisfy:

$$T1 + T2 \le \frac{1}{f2}$$

where f2 is a backlight refresh frequency.

With such arrangement, the duration for the micro control unit 2 receiving and sending the entire of the backlight data is less than or equal to the backlight refresh period, so that the backlight source can complete the refresh of luminance in time.

In some embodiments, a display refresh frequency of the image frame is 60 HZ, and the backlight refresh frequency is 480 HZ. In this case, the period of the first vertical synchronization signal is about 18.8 ms, and the backlight refresh period is about 2.08 ms.

In some embodiments, the duration T1 of the first preset time period and the duration T2 of the first preset time period satisfy:

$$\frac{1}{2} \le \frac{T1}{T2} \le 2.$$

It should be noted that in the embodiment of the present disclosure, the magnitudes of T1 and T2 and a ratio of T1 and T2 may be preset according to actual needs.

Figure 4:
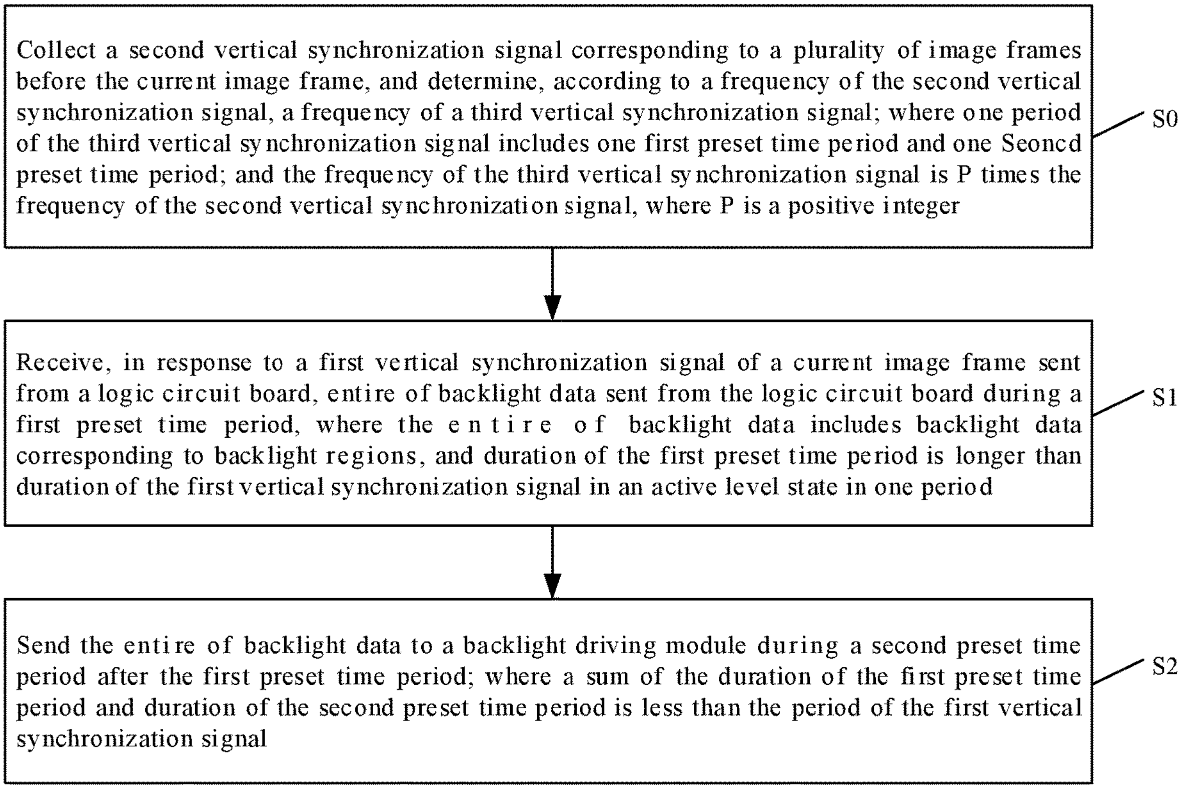
FIG. 4 is a flowchart showing another backlight data transmission method provided in an embodiment of the present disclosure.

FIG. 4 is a flowchart showing another backlight data transmission method provided in an embodiment of the present disclosure. As shown in FIG. 4, the backlight data transmission method is applied to a micro control unit in a local dimming backlight system. In addition to the above steps S1 and S2, the backlight data transmission method further includes step S0 before step S1; only step S0 will be described in detail below.

At Step S0, a second vertical synchronization signal corresponding to a plurality of image frames before the current image frame is collected, and a frequency of a third vertical synchronization signal is determined according to a frequency of the second vertical synchronization signal. One period of the third vertical synchronization signal includes a first preset time period and a preset second time period; and the frequency of the third vertical synchronization signal is P times the frequency of the second vertical synchronization signal, where P is a positive integer.

The third vertical synchronization signal is a signal generated inside the micro control unit 2 and corresponds to the first preset time period and the second preset time period. The time period during which the third vertical synchronization signal is in an active level state corresponds to the first preset time period, and the time period during which the third vertical synchronization signal is in an inactive level state corresponds to the second preset time period. The micro control unit 2 performs a frequency multiplication process on the second vertical synchronization signal to obtain the third vertical synchronization signal. The period of the third vertical synchronization signal is 1/P of the period of the second vertical synchronization signal.

With such arrangement, the time taken for the backlight data to be transmitted from the logic circuit board 1 to the light-emitting driving module 3 may be defined as T0/P, where T0 is a period of the vertical synchronization signal corresponding to the image frame. In this case, the total time delay in the local dimming process is less than or equal to (1+1/P)*T0.

In an embodiment of the present disclosure, a frequency of the second vertical synchronization signal corresponding to several image frames before the current image frame is captured, and then the frequency of the third vertical synchronization signal is readjusted, thereby ensuring that the frequency of the third vertical synchronization signal changes synchronously when the frequency of the vertical synchronization signal of the image frame from the logic circuit board 1 changes.

In some embodiments, P is 8, which means that the second vertical synchronization signal is frequency-multiplied by 8 to obtain the third vertical synchronization signal, and in this case, the total time delay in the local dimming process is about 1.125*T0. Taking the display refresh frequency of the image frame being 60 HZ as an example, in this case the total time delay in the local dimming process is about 18.75 ms.

It should be noted that the time period during which the third vertical synchronization signal is in the active level state (corresponding to the first preset time period) and the time period during which the third vertical synchronization signal is in the inactive level state (corresponding to the second preset time period) in one period of the third vertical synchronization signal may be controlled by a timer in the micro control unit 2. The micro control unit 2 resets the count of the timer and restarts counting after receiving the vertical synchronization signal of the image frame from the logic circuit board 1.

In practical applications, the micro control unit 2 may also send the third vertical synchronization signal to the logic circuit board 1 and the light-emitting driving module 3, so that the logic circuit board 1 sends the entire of the backlight data to the micro control unit 2 during the first preset time period, and that the light-emitting driving module 3 receives the entire of the backlight data from the micro control unit 2 during the second preset time period.

Figure 5:
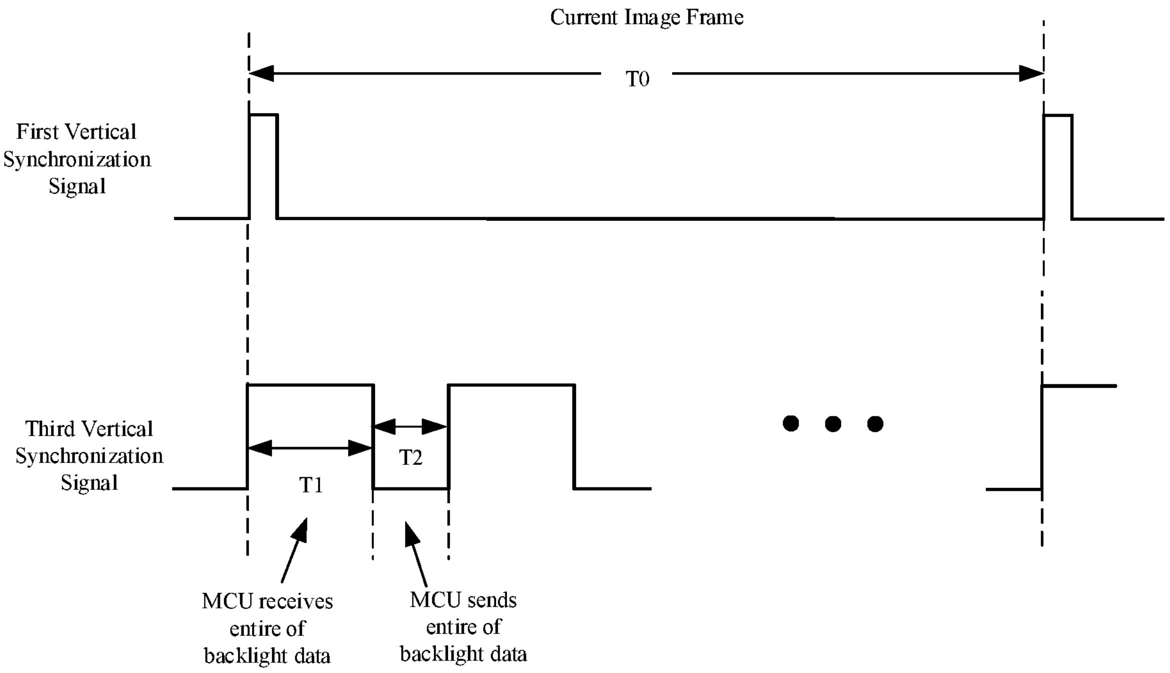
FIG. 5 is a timing diagram corresponding to a process of transmitting backlight data from a logic circuit board to a light-emitting driving module according to the present disclosure.

FIG. 5 is a timing diagram corresponding to the process of transmitting the backlight data from a logic circuit board to a light-emitting driving module according to the present disclosure. As shown in FIG. 5, taking the example in which the active level state is a higher level state and the inactive level state is a lower level state, the time period during which the third vertical synchronization signal is in a higher level state corresponds to the first preset time period in which the logic circuit board sends the entire of the backlight data to the micro control unit; and the time period during which the third vertical synchronization signal is in a lower level state corresponds to the second preset time period in which the micro control unit sends the entire of the backlight data to the light-emitting driving module.

Compared with the related art, according to the technical solution of the present disclosure, transmitting the backlight data from the logic circuit board to the light-emitting driving module takes a shorter time, thereby reducing the total time delay in the local dimming process, and reducing the risk of the display signal and the backlight signal getting out of synchronization.

Based on the same inventive concept, an embodiment of the present disclosure further provides a micro control unit, including: a processor, and a storage medium having a computer program stored thereon which, when executed by the processor, causes the backlight data transmission method provided in any of the above embodiments to be implemented.

With continued reference to FIG. 1, based on the same inventive concept, an embodiment of the present disclosure further provides a local dimming backlight system, including: a logic circuit board 1, a backlight driving module 3, and a micro control unit 2. For specific description of the micro control unit 2, reference may be made to corresponding contents in the foregoing embodiments, and details are not repeated herein.

Those of ordinary skill in the art will appreciate that all or some operations of the above described method, and functional modules/units in the apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the computer storage medium includes volatile, nonvolatile, removable and non-removable medium implemented in any method or technology for storing information, such as computer-readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed example embodiments, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the present disclosure as set forth in the appended claims.

What is claimed is:

1. A backlight data transmission method applied to a micro control unit and comprising:

receiving, in response to a first vertical synchronization signal of a current image frame sent from a logic circuit board, an entire of backlight data sent from the logic circuit board during a first preset time period, wherein the entire of the backlight data comprises backlight data corresponding to backlight regions, and wherein duration of the first preset time period is longer than duration of the first vertical synchronization signal in an active level state in one period; and sending the entire of the backlight data to a backlight driving module during a second preset time period after the first preset time period, wherein a sum of the duration of the first preset time period and duration of the second preset time period is less than a period of the first vertical synchronization signal, wherein the duration T1 of the first preset time period satisfies:

$$\frac{A*n1+B}{f1}*\alpha \le T1 < \frac{1}{f2}$$

where n1 is a total number of the backlight regions, A is a bit number of backlight data corresponding to one of the backlight regions, B is a bit number of non-backlight data transmitted during a process of transmitting the entire of the backlight data between the logic circuit board and the micro control unit, f1 is a signal transmission frequency between the logic circuit board and the micro control unit, f2 is a backlight refresh frequency, and a is a first preset margin coefficient with 1≤α≤1.5.

2. The method according to claim 1, wherein the backlight data is transmitted between the logic circuit board and the micro control unit based on a serial peripheral interface protocol.

3. The method according to claim 1, wherein the bit number A of backlight data corresponding to one of the backlight regions is 16, the bit number B of non-backlight data transmitted during the process of transmitting the entire of the backlight data between the logic circuit board and the micro control unit is 32, and the preset margin coefficient α is 1.1.

4. The method according to claim 1, wherein the backlight data is transmitted between the micro control unit and the backlight driving module based on a serial peripheral interface protocol.

5. The method according to claim 1, wherein the duration T2 of the second preset time period satisfies:

$$\frac{A*n2+C+N*D}{f3}*\beta \le T2 < \frac{1}{f2}$$

where n2 is a number of backlight regions corresponding to one communication channel through which the most backlight data is transmitted between the micro control unit and the backlight driving module, A is a bit number of backlight data corresponding to one of the backlight regions, C is a bit number of non-backlight data transmitted during a process of transmitting the entire of the backlight data between the micro control unit and the backlight driving module, N is a number of driving chips in the backlight driving module, D is a bit number for identifying one of the driving chips, f3 is a signal transmission frequency between the micro control unit and the backlight driving module, f2 is a backlight refresh frequency, and β is a second preset margin coefficient with 1≤β1.5.

6. The method according to claim 5, wherein the bit number A of the backlight data corresponding to one of the backlight regions is 16, the bit number C of the non-backlight data transmitted during the process of transmitting the entire of the backlight data between and the micro control unit and the backlight driving module is 24, the bit number D for identifying one of the driving chips is 8, and the second preset margin coefficient β is 1.1.

7. The method according to claim 1, wherein the total number of the backlight regions is 72; and two communication channels are provided between the micro control unit and the backlight driving module, one of the two communication channels is configured to transmit backlight data corresponding to fourth backlight regions of the seventy-two backlight regions, and the other of the two communication channels is configured to transmit backlight data corresponding to the remaining thirty-two backlight regions of the seventy-two backlight regions.

8. The method according to claim 1, wherein when the first vertical synchronization signal received from the logic circuit board is switched from an inactive level state to an active level state, the micro control unit starts receiving the backlight data from the logic circuit board.

9. The method according to claim 1, wherein the duration T1 of the first preset time period and the duration T2 of the first preset time period satisfy:

$$T1+T2 \le \frac{1}{f2}$$

where f2 is a backlight refresh frequency.

10. The method according to claim 1, wherein the duration T1 of the first preset time period and the duration T2 of the first preset time period satisfy:

$$\frac{1}{2} \le \frac{T1}{T2} \le 2.$$

11. The method according to claim 1, wherein before receiving, in response to the first vertical synchronization signal sent from the logic circuit board, the entire backlight data sent from the logic circuit board during the first preset time period, the method further comprises:

collecting a second vertical synchronization signal corresponding to a plurality of image frames before the current image frame, and determining, according to a frequency of the second vertical synchronization signal, a frequency of a third vertical synchronization signal, wherein one period of the third vertical synchronization signal comprises: the first preset time period and the second preset time period, wherein the frequency of the third vertical synchronization signal is P times the frequency of the second vertical synchronization signal, where P is a positive integer.

12. The method according to claim 11, wherein P is 8.

13. A micro control unit, comprising: a processor, and a storage medium having a computer program stored thereon which, when executed by the processor, the computer program implements the method according to claim 1.

14. A local dimming backlight system, comprising: a logic circuit board, a backlight driving module, and the micro control unit according to claim 13.

15. A backlight data transmission method applied to a micro control unit and comprising:

receiving, in response to a first vertical synchronization signal of a current image frame sent from a logic circuit board, an entire of backlight data sent from the logic circuit board during a first preset time period, wherein the entire of the backlight data comprises backlight data corresponding to backlight regions, and wherein duration of the first preset time period is longer than duration of the first vertical synchronization signal in an active level state in one period; and sending the entire backlight data to a backlight driving module during a second preset time period after the first preset time period, wherein a sum of the duration of the first preset time period and duration of the second preset time period is less than a period of the first vertical synchronization signal, wherein the duration T1 of the first preset time period satisfies:

$$\frac{A*n1+B}{f1}*\alpha \leq T1 < \frac{1}{f2}$$

where n1 is a total number of the backlight regions, A is a bit number of backlight data corresponding to one of the backlight regions, B is a bit number of non-backlight data transmitted during a process of transmitting the entire of the backlight data between the logic circuit board and the micro control unit, f1 is a signal transmission frequency between the logic circuit board and the micro control unit, f2 is a backlight refresh frequency, and α is a first preset margin coefficient with 1≤α≤1.5, the duration T2 of the second preset time period satisfies:

$$\frac{A*n1+B}{f1}*\alpha \leq T1 < \frac{1}{f2}$$

where n2 is a number of backlight regions corresponding to one communication channel through which the most backlight data is transmitted between the micro control unit and the backlight driving module, A is a bit number of backlight data corresponding to one of the backlight regions, C is a bit number of non-backlight data transmitted during a process of transmitting the entire of the backlight data between the micro control unit and the backlight driving module, N is a number of driving chips in the backlight driving module, D is a bit number for identifying one of the driving chips, f3 is a signal transmission frequency between the micro control unit and the backlight driving module, f2 is a backlight refresh frequency, and β is a second preset margin coefficient with 1≤β≤1.5.

* * * * *